(12) United States Patent
Ishimasa et al.

(10) Patent No.: US 8,908,088 B2
(45) Date of Patent: Dec. 9, 2014

(54) IMAGE PICK-UP APPARATUS CAPABLE OF CORRECTING SHADING DUE TO A CLOSING TRAVEL OPERATION OF A SHUTTER TO PICK UP STATIC IMAGE

(71) Applicant: Canon Kabushiki Kaisha, Tokyo (JP)

(72) Inventors: Toru Ishimasa, Kawasaki (JP); Hidetoshi Nishigori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/764,192

(22) Filed: Feb. 11, 2013

(65) Prior Publication Data

US 2013/0148014 A1    Jun. 13, 2013

Related U.S. Application Data

(62) Division of application No. 12/843,473, filed on Jul. 26, 2010, now Pat. No. 8,390,735.

(30) Foreign Application Priority Data

Aug. 17, 2009  (JP) ................................ 2009-188429

(51) Int. Cl.
    *H04N 5/238*    (2006.01)
    *H04N 5/357*    (2011.01)
    *G03B 9/14*     (2006.01)

(52) U.S. Cl.
    CPC ............. *H04N 5/238* (2013.01); *H04N 5/3572* (2013.01); *G03B 9/14* (2013.01)
    USPC ........................................................ 348/363

(58) Field of Classification Search
    CPC ........................................................ H04N 9/64
    USPC .......................................... 348/363, 367, 368
    See application file for complete search history.

(56) References Cited

U.S. PATENT DOCUMENTS 5,159,372 A    10/1992  Nomura et al.
5,434,902 A     7/1995  Bruijns (Continued)

FOREIGN PATENT DOCUMENTS

| JP | 09-189935 A   | 7/1997  |
| JP | 2003-005252 A | 1/2003  |
| JP | 2006-178366 A | 7/2006  |
| JP | 2006-276763 A | 10/2006 |

OTHER PUBLICATIONS

May 13, 2014 Japanese Office Action that issued in Japanese Patent Application No. 2009-188429.

*Primary Examiner* — Gary C Vieaux
(74) *Attorney, Agent, or Firm* — Cowan, Liebowitz & Latman, P.C.

(57) ABSTRACT

An image pick-up apparatus that is capable of correcting shading due to a closing travel operation of a shutter by a simple process. An image pick-up device picks up the image formed. A shutter unit opens and closes a substantially rectangular aperture corresponding to image pick-up area of the image pick-up device by means of a plurality of rotating shutter blades. The shutter blades travel in mutually opposite directions perpendicular to a long side of the aperture while keeping edges of the shutter blades facing the aperture are parallel to the long side so that edge portions that cover a center area of the aperture start shading the aperture before edge portions that cover four corner areas of the aperture start shading the aperture.

5 Claims, 14 Drawing Sheets

(56) References Cited

U.S. PATENT DOCUMENTS

| | | | |
|---|---|---|---|
| 5,761,070 A * | 6/1998 | Conners et al. | 700/223 |
| 6,091,445 A | 7/2000 | Matsui et al. | |
| 6,141,046 A | 10/2000 | Roth et al. | |
| 7,374,352 B2 * | 5/2008 | Kudo | 396/458 |
| 7,753,536 B2 * | 7/2010 | Chung et al. | 353/97 |
| 8,102,445 B2 | 1/2012 | Kanemitsu et al. | |
| 2004/0222709 A1 | 11/2004 | Naganuma et al. | |
| 2006/0132627 A1 * | 6/2006 | Ikuta | 348/252 |
| 2008/0259191 A1 | 10/2008 | Imamura et al. | |
| 2009/0041447 A1 | 2/2009 | Kim et al. | |
| 2009/0147106 A1 | 6/2009 | Sakamoto et al. | |
| 2009/0238554 A1 * | 9/2009 | Niwamae | 396/484 |

* cited by examiner

IMAGE PICK-UP APPARATUS CAPABLE OF CORRECTING SHADING DUE TO A CLOSING TRAVEL OPERATION OF A SHUTTER TO PICK UP STATIC IMAGE

CROSS-REFERENCE TO RELATED APPLICATIONS

This application is a divisional of application Ser. No. 12/843,473, filed Jul. 26, 2010, now U.S. Pat. No. 8,390,735, the entire disclosure of which is hereby incorporated by reference.

BACKGROUND OF THE INVENTION

1. Field of the Invention

The present invention relates to an image pick-up apparatus such as a digital camera that picks up a static image, and particularly relates to improvement of a shutter unit.

2. Description of the Related Art

An image pick-up apparatus such as a digital camera, an image pick-up apparatus mounted on a cellular phone, or the like is provided with a shutter unit that opens and closes an aperture for exposure arranged between a lens and an image pick-up device. A shutter unit used in a compact type digital camera or a cellular phone opens and closes an aperture by driving an electromagnetic actuator to rotate one or more shutter blades.

For example, Japanese Laid-Open Patent Publication (Kokai) No. 2003-005252 (JP 2003-005252A) discloses a shutter unit that drives a pair of shutter blades by an electromagnetic actuator.

However, as described below, the shutter unit of the above-mentioned publication has a problem that an exposure distribution in a picked-up image is asymmetrical.

FIG. 13 is a view showing a closing travel operation of the shutter blades in the conventional shutter unit that is described in the above-mentioned publication. A pair of shutter blades 30 and 50 are driven by an electromagnetic actuator (not shown), rotate about respective rotating shafts in opposite directions, and open/close a substantial aperture W of the shutter unit that defines a shape of a shooting screen. In a digital camera that allows digital preview, the shutter is open until a release button is pushed. When the release button is pushed, pixels start to accumulate electric charge unison. The shutter closes after the elapse of time defined by a setting shutter speed, and the accumulated electric charge is outputted as a signal.

The rectangular aperture W is equally divided into four, and a first quadrant A, a second quadrant B, a third quadrant C, and a fourth quadrant D are set up. As shown in FIG. 13, when the shutter blades 30 and 50 close the aperture W, the first quadrant A is closed first, the third and fourth quadrants C and D are closed next, and then the second quadrant B is closed.

Accordingly, as shown in FIG. 14, the exposure of the second quadrant B becomes extremely larger than the exposure of the first quadrant A, the third quadrant C, and the fourth quadrant D. This increases necessity of an electrical correction. However, a distribution of the exposure is asymmetrical not only about a center line in a direction of a short side of the aperture W but also about a center line in a direction of a long side. Therefore, since volume of correction data becomes large and a process becomes complicated, the process needs much time.

SUMMARY OF THE INVENTION

The present invention provides an image pick-up apparatus that is capable of correcting shading due to a closing travel operation of a shutter by a simple process.

Accordingly, an aspect of the present invention provides an image pick-up apparatus to pick up a static image comprising a lens adapted to form an image of a subject, an image pick-up device adapted to pick up the image formed, a shutter unit adapted to open and close a substantially rectangular aperture corresponding to image pick-up area of the image pick-up device by means of a plurality of rotating shutter blades, wherein the shutter blades travel in mutually opposite directions perpendicular to a long side of the aperture while keeping edges of the shutter blades facing the aperture are parallel to the long side so that edge portions that cover a center area of the aperture start shading the aperture before edge portions that cover four corner areas of the aperture start shading the aperture.

According to the present invention, since the shading due to the closing travel operation of the shutter in the picked-up image becomes symmetrical about the central line parallel to the long side of the aperture, it becomes possible to correct the shading due to the closing travel operation of the shutter by the simple process.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
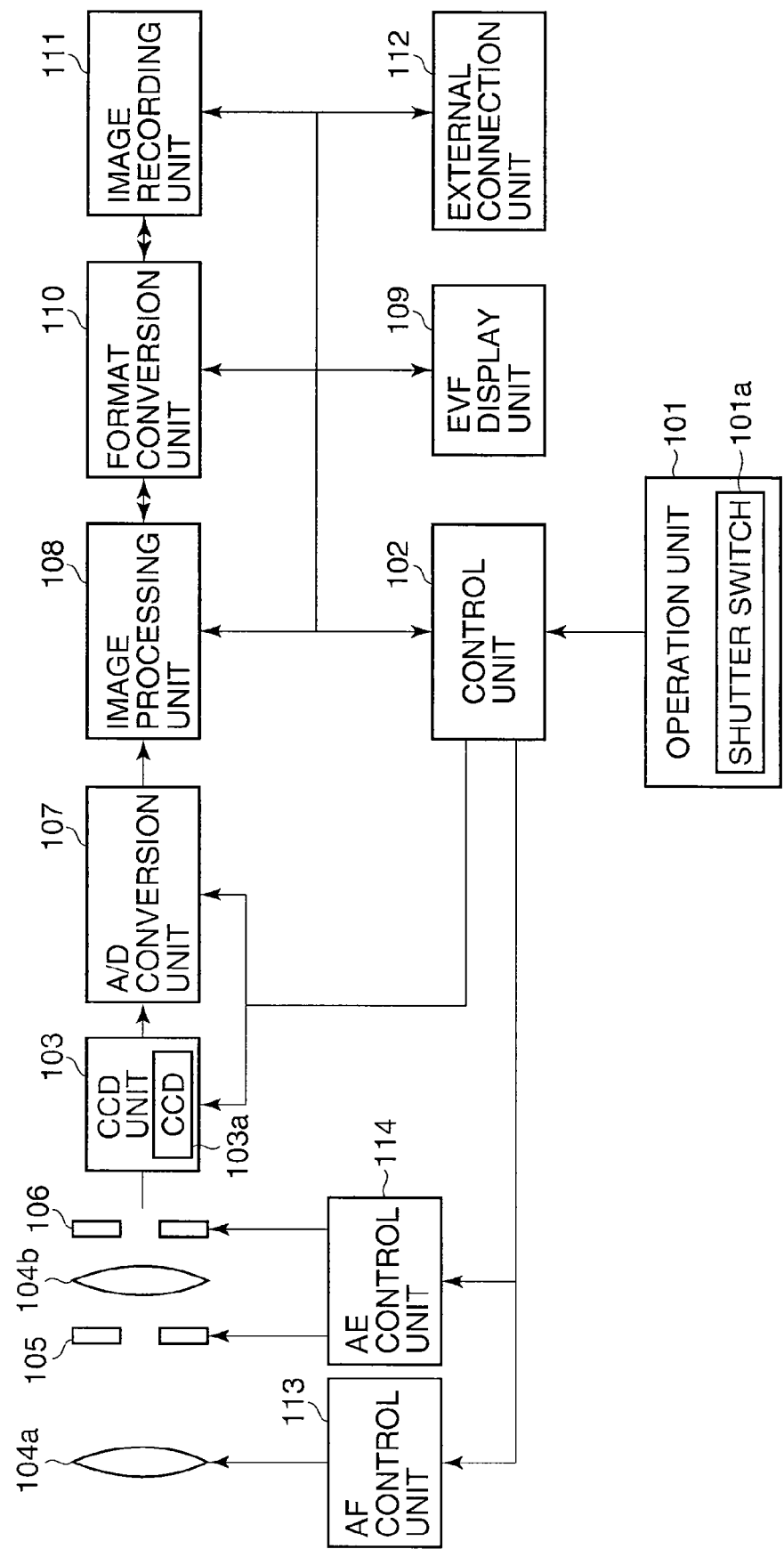
FIG. 1 is a block diagram schematically showing a configuration of an image pick-up apparatus according to an embodiment of the present invention.

FIG. 1 is a block diagram schematically showing a configuration of an image pick-up apparatus according to an embodiment of the present invention. The image pick-up apparatus is constituted as a digital camera. An optical system of the digital camera shown in FIG. 1 comprises a focus lens 104a, a diaphragm unit 105, a zoom lens 104b, a shutter unit 106, and a CCD 103a as an image pick-up device, which are arranged in this order from a subject side. It should be noted that although the diaphragm unit 105 and the shutter unit 106 are separately arranged on both sides of the zoom lens 104b in FIG. 1, the diaphragm unit 105 can be arranged to at the nearest position of the shutter unit 106.

In FIG. 1, an operation unit 101 is constituted by various kinds of switches for performing various kinds of instructions to the digital camera. These switches include a shutter switch 101a. The shutter switch 101a has a first switch that turns on by a first depression stroke of a shutter button and a second switch that turns on by a second depression stroke longer than the first depression stroke.

A control unit 102 controls an entire operation of the digital camera, and controls an operation of each part of the digital camera according to an ON signal of each switch from the operation unit 101. A CCD unit 103 including the CCD 103a performs photoelectric conversion of an optical image of a subject that is formed by an incident light through the focus lens 104a, the diaphragm unit 105, the zoom lens 104b, and the shutter unit 106; and outputs a converted signal as an analog image signal.

An A/D conversion unit 107 applies a sampling process, a gain control process, an A/D conversion process, etc. to the analog image signal outputted from the CCD 103a of the CCD unit 103; and outputs a processed signal as a digital image signal. It should be noted that the CCD 103a as the image pick-up device is driven and controlled by a drive circuit (not shown) of the CCD unit 103 under the control by the control unit 102. The A/D conversion unit 107 also has a function to correct shading due to a closing travel operation of the shutter mentioned later by controlling a gain at the time of acquiring the analog image signal (a pixel signal) of each pixel of the CCD 103a by the above-mentioned gain control.

An image processing unit 108 applies various kinds of image processes such as a shading correction process and a white balance process to the digital image signal outputted by the A/D conversion unit 107, and outputs the processed signal as image data. In this case, the shading correction process applied by the image processing unit 108 is a correction of inconsistencies in brightness due to characteristics of the focus lens 104a, the zoom lens 104b, the CCD 103a, etc. An EVF display unit 109 is constituted by a liquid crystal display screen etc., and displays the image data to which the image process has been applied by the image processing unit 108.

A format conversion unit 110 converts a format of the image data outputted by the image processing unit 108 into a format of a compression standard such as JPEG, and outputs the converted data to an image recording unit 111. The image recording unit 111 records the compressed image data, which has been converted in the format by the format conversion unit 110, into a memory (not shown) in the digital camera, an external memory inserted into the digital camera, or the like.

An external connection unit 112 functions as an interface for connecting the digital camera to external devices, such as a personal computer and a printer. An AF control unit 113 moves the focus lens 104a in an optical axis direction so that an optical image of the subject is automatically focused onto the CCD 103a of the CCD unit 103 (an AF process). An AE control unit 114 automatically achieves a proper exposure by controlling the aperture diameter of the diaphragm unit 105 and the shutter speed specified by the shutter unit 106 (an AE process).

It should be noted that the AF process and the AE process mentioned above can be performed using the image data outputted by the image processing unit 108. The digital camera also includes an electric power source unit (not shown) such as a secondary battery.

Next, a shooting operation of the digital camera will be described. When a power switch (not shown) included in the operation unit 101 is turned on, the control unit 102 supplies power-supply voltage to the above-mentioned units that constitute the digital camera. When supplying the power-supply voltage, shutter blades of the shutter unit 106 open and the light from the subject is incident on the CCD unit 103 to form an optical image of the subject on the CCD 103a. The CCD unit 103 performs the photoelectric conversion of the optical image of the subject under the control of the control unit 102, and outputs the converted signal as the analog image signal.

The analog image signal is processed by the gain adjustment (control), the A/D conversion, etc by the A/D conversion unit 107, is processed by the shading correction etc. by the image processing unit 110, and is displayed on the EVF display unit 109 under the control by the control unit 102. In this case, the control unit 102 controls a focusing operation by the AF control unit 113 and an exposure determination operation by an AE control unit 114, based on the image data inputted from the image processing unit 110.

When the first switch of the shutter switch 101a is turned on, the control unit 102 determines shooting conditions such as a focus position of the focus lens 104a at the shooting time and the optimum light exposure based on the image data inputted from the image processing unit 110 at this time. In this case, the control unit 102 determines the aperture diameter of the diaphragm unit 105, and a shutter speed, which is an interval to closing the shutter unit 106 from starting to accumulate electric charge, as the optimum light exposure. Then, when the second switch of the shutter switch 101a is turned on, the control unit 102 controls the AF control unit 113 and the AE control unit 114 so as to shoot under the determined shooting conditions.

Figure 2:
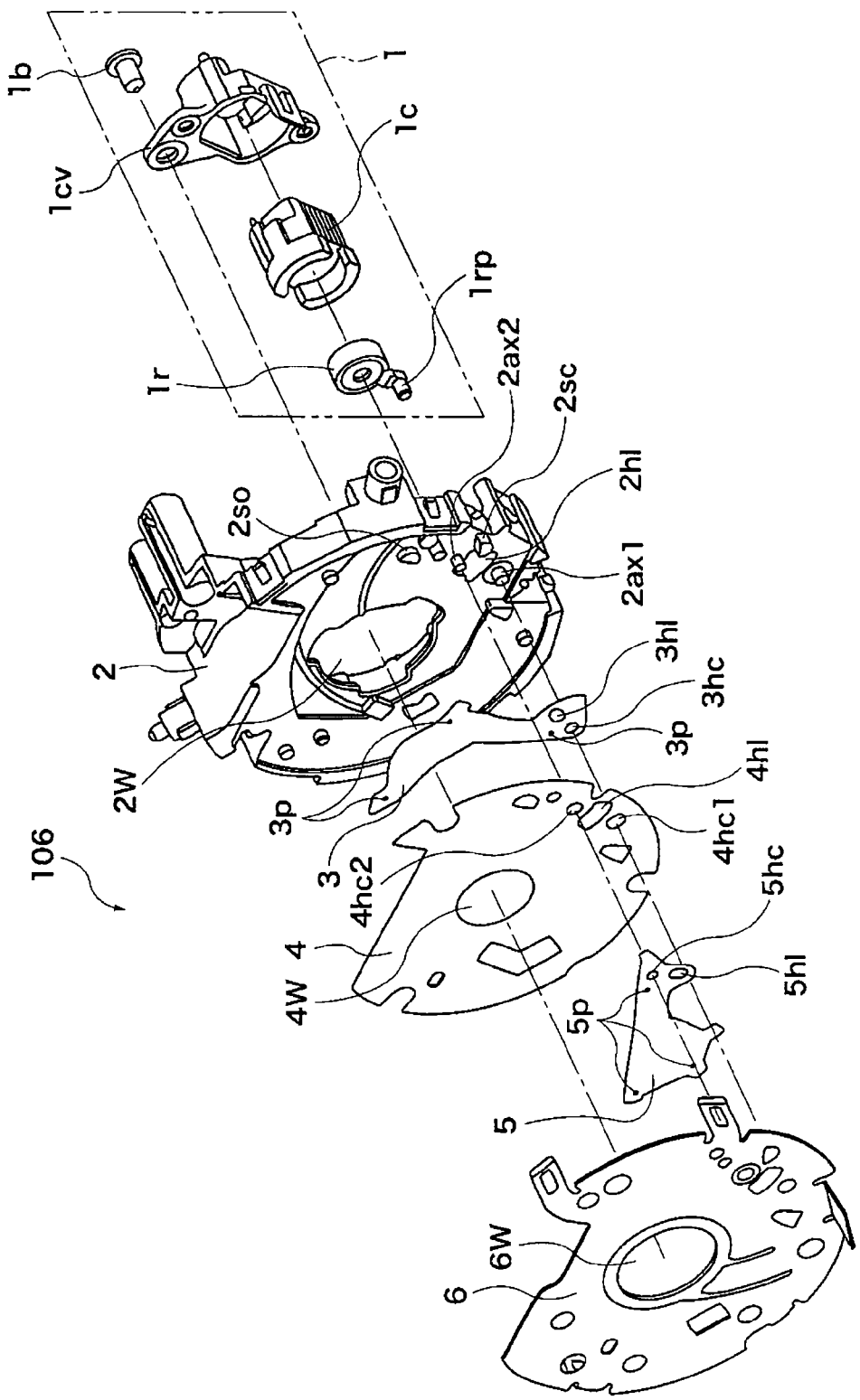
FIG. 2 is an exploded perspective view of the shutter unit shown in FIG. 1.
Figure 3:
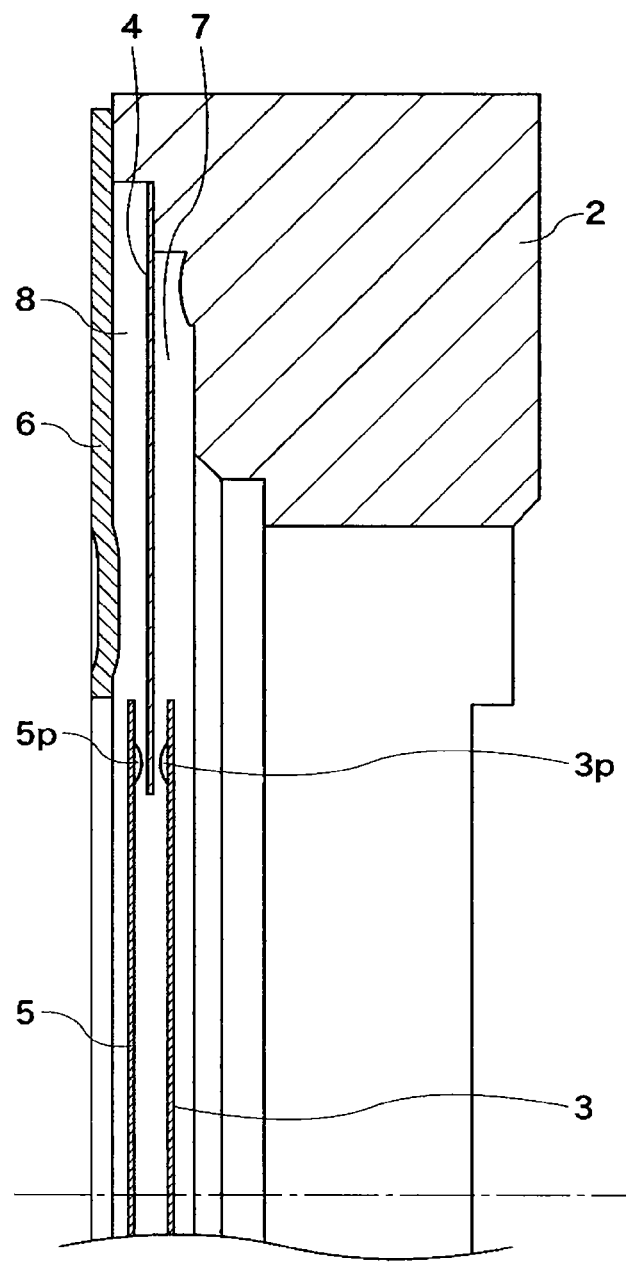
FIG. 3 is a front view showing a standby condition (an opened condition) of the shutter unit shown in FIG. 1.

Next, a configuration of the shutter unit 106 will be described with reference to FIG. 2, FIG. 3, etc. As shown in FIG. 2, the shutter unit 106 basically consists of an electromagnetic actuator 1, a shutter base 2, an upper shutter blade 3, a separation plate 4, a lower shutter blade 5, and a shutter cover 6.

The electromagnetic actuator 1 is attached to the shutter base 2 by a bolt 1b under a condition where an excitation coil 1c and a rotor 1r are covered with an actuator cover 1cv. In this case, a drive pin 1rp formed on the rotor 1r is jutting from a long hole 2hl formed on the shutter base 2 in a direction of the upper shutter blade 3.

The upper shutter blade 3 and the lower shutter blade 5 are pivotally supported by the shutter base 2 while sandwiching the separation plate 4. That is, a blade-supporting-shaft 2ax1 of the shutter base 2 is fitted into a round hole 3hc of the upper shutter blade 3 and a round hole 4hc1 of the separation plate 4. A blade-supporting-shaft 2ax2 of the shutter base 2 is fitted into a round hole 5*hc* of the lower shutter blade 5 and a round hole 4*hc*2 of the separation plate 4.

The drive pin 1*rp* formed on the rotor 1*r* is inserted into all of the long hole 1*rp* of the shutter base 2, a long hole 3*hl* of the upper shutter blade 3, a long hole 5*hl* of the lower shutter blade 5, and a long hole 4*hl* of the separation plate 4. In this case, the upper shutter blade 3 is pivotally supported by the blade-supporting-shaft 2*ax*1 only, the lower shutter blade 5 is pivotally supported by the blade-supporting-shaft 2*ax*2 only, and the blades can rotate freely.

When the rotor 1*r* rotates, the drive pin 1*rp* contacts the wall surfaces of the long holes 3*hl* and 5*hl*, which transfers the rotation force of the rotor 1*r* to the shutter blades 3 and 5 via the drive pin 1*rp*. As a result, the shutter blades 3 and 5 are driven to open and to close. In this case, the maximum traveling amount of the shutter blades 3 and 5 during an opening operation is regulated by an opening stopper 2*so* formed on the shutter base 2, and the maximum traveling amount during a closing operation is regulated by a closing stopper 3*sc* formed on the shutter base 2.

It should be noted that a higher traveling speed of the shutter blades during the closing operation is desirable in order to improve image quality by decreasing a difference among timings to finish the accumulation of electric charge in the respective pixels of the image pick-up device. Accordingly, three hemispherical projections 3*p* are formed on the upper shutter blade 3, and three hemispherical projections 5*p* are formed on the lower shutter blade 5 (see FIG. 3). Since the projections 3*p* and 5*p* decrease frictional resistance between the shutter blades 3 and 5 and the separation plate 4 when the shutter blades 3 and 5 travel, the traveling speed of the shutter blades can be increased as much as possible. As shown in FIG. 3, a blade room 7 is formed between the shutter base 2 and the separation plate 4 for preventing dust from adhering to the upper shutter blade 3. In the same manner, a blade room 8 is formed between the separation plate 4 and the shutter cover 6 for preventing dust from adhering to the lower shutter blade 5.

Figure 10:
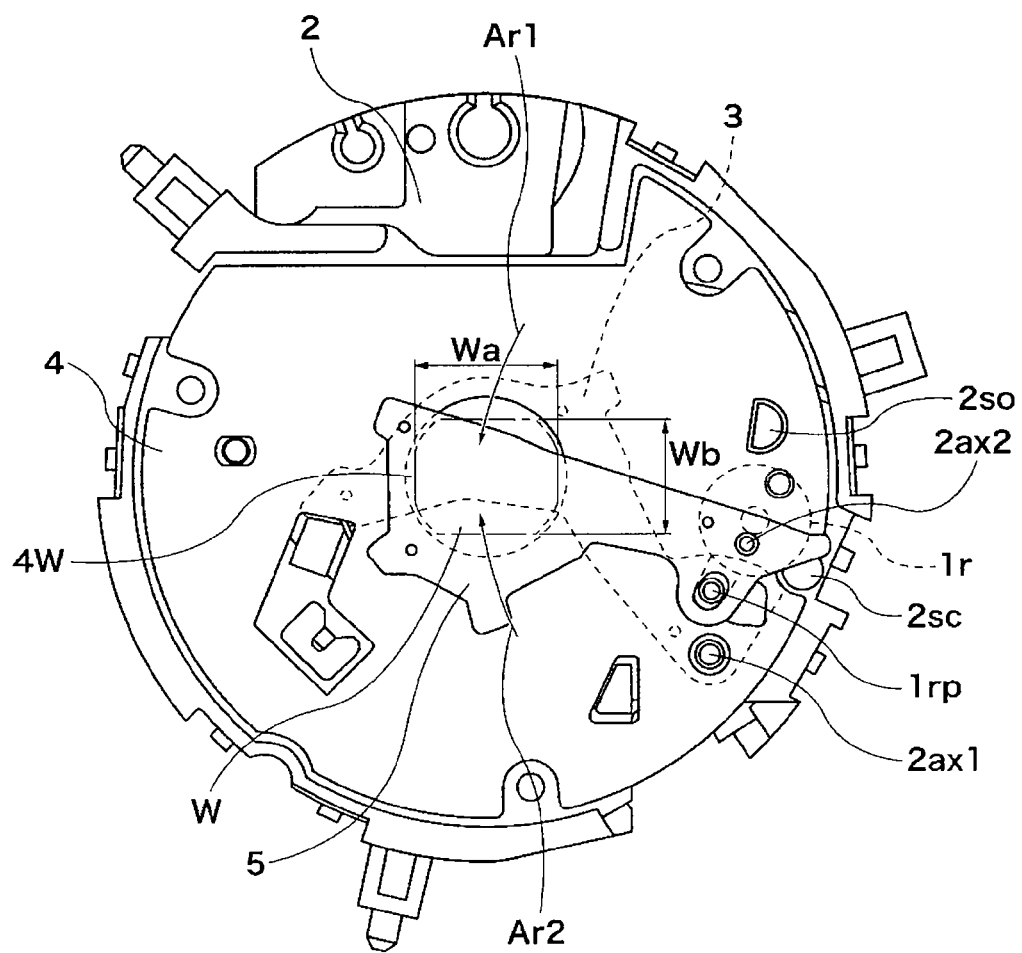
FIG. 10 is a front view showing a condition in which the shutter unit shown in FIG. 1 has finished closing.

Apertures 2W, 4W, and 6W are formed on the central portions of the shutter base 2, the separation plate 4, and the shutter cover 6, respectively. A mask (not shown) to intercept an unnecessary light is arranged in front of the CCD 103*a*. An aperture of the mask is rectangular with a long horizontal side and a short vertical side. Accordingly, as shown in FIG. 4, FIG. 10, etc., the substantial aperture W of the shutter unit 106 that regulates a shape of a shooting screen presents a rectangular shape with a long side Wa and a short side Wb.

Figure 4:
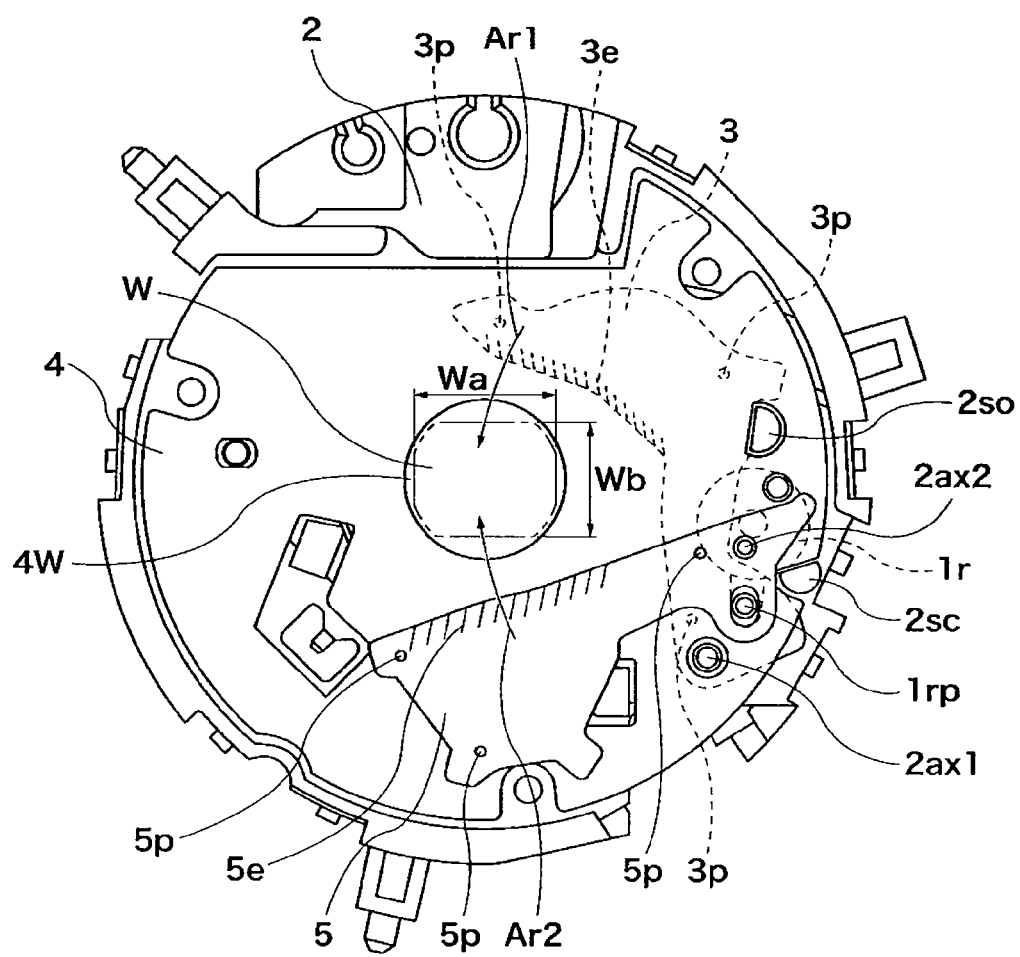
FIG. 4 is a sectional view showing the standby condition of the shutter unit shown in FIG. 1.
Figure 5:
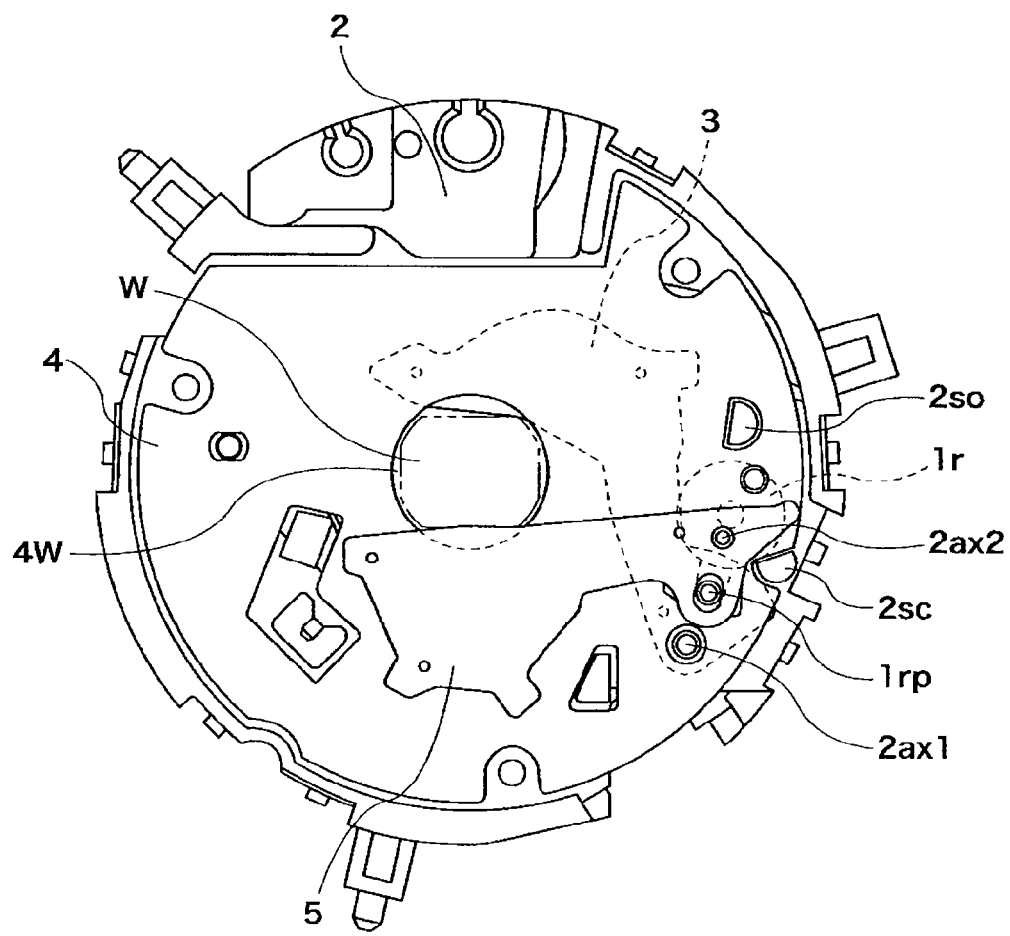
FIG. 5 is a front view showing a condition in which the shutter unit shown in FIG. 1 starts closing.
Figure 6:
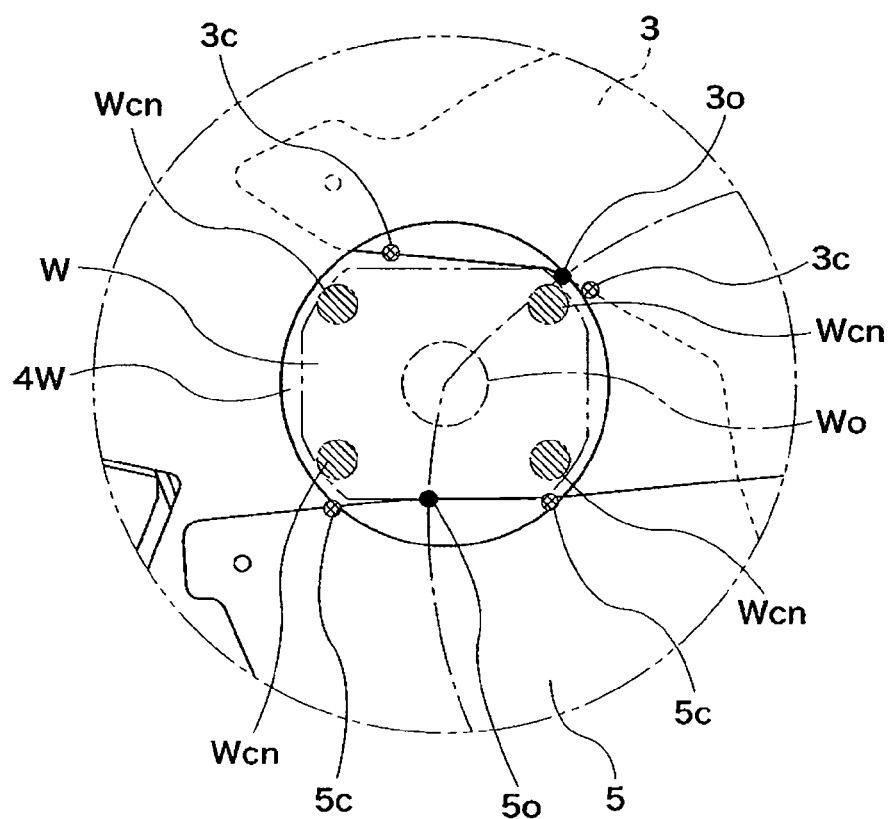
FIG. 6 is an enlarged drawing of an aperture of FIG. 5.

Next, the upper shutter blade 3 and the lower shutter blade 5 are described in detail based on FIG. 4 through FIG. 10. FIG. 4 is a front view showing a standby condition (an opened condition) for waiting to shoot, FIG. 5 is a front view showing a condition where the upper shutter blade 3 and the lower shutter blade 5 start closing, and FIG. 6 is an enlarged view of the aperture W in FIG. 5.

Figure 7:
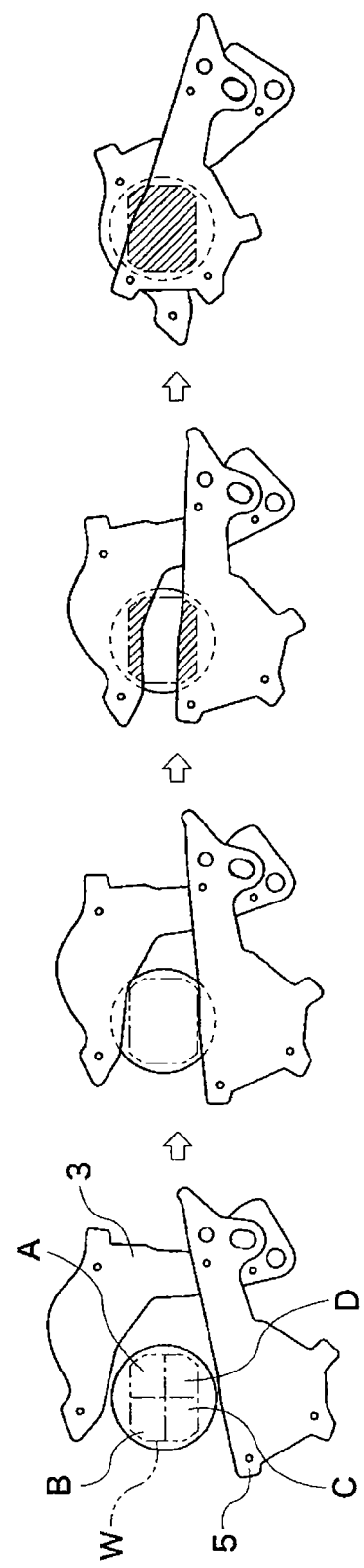
FIG. 7 is a view showing a closing travel operation of the shutter blades in the shutter unit shown in FIG. 1.
Figure 8:
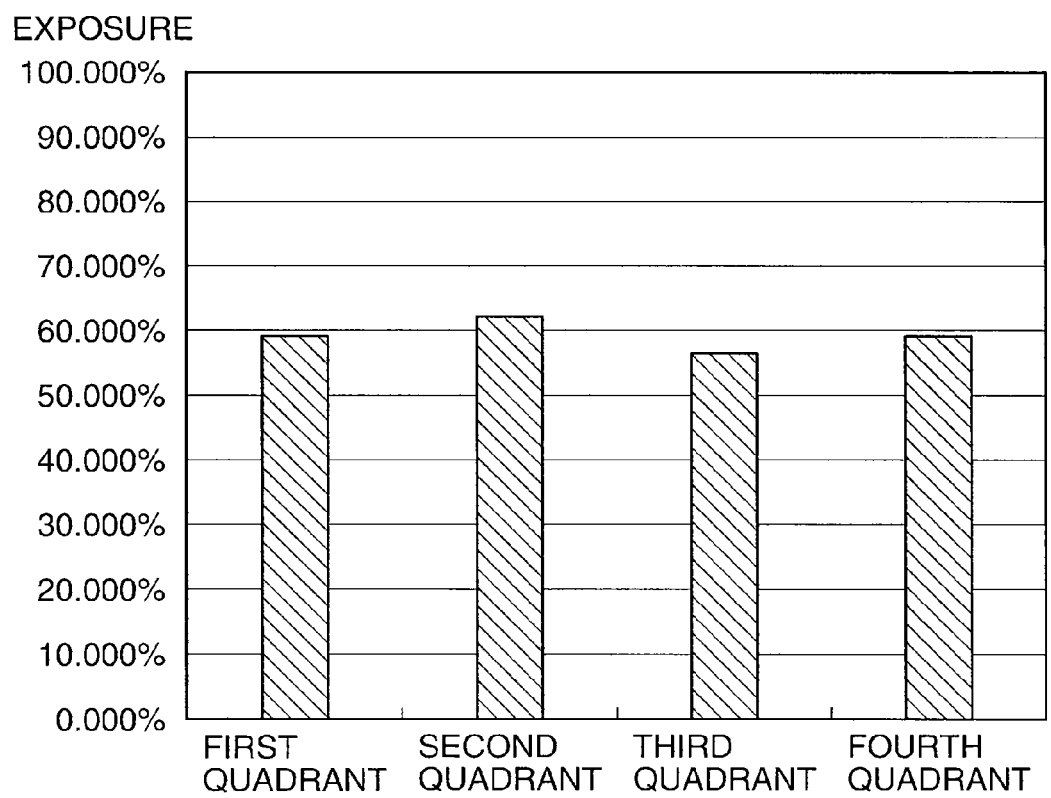
FIG. 8 is a graph showing exposures in quadrants of the aperture in the shutter unit shown in FIG. 1.
Figure 9:
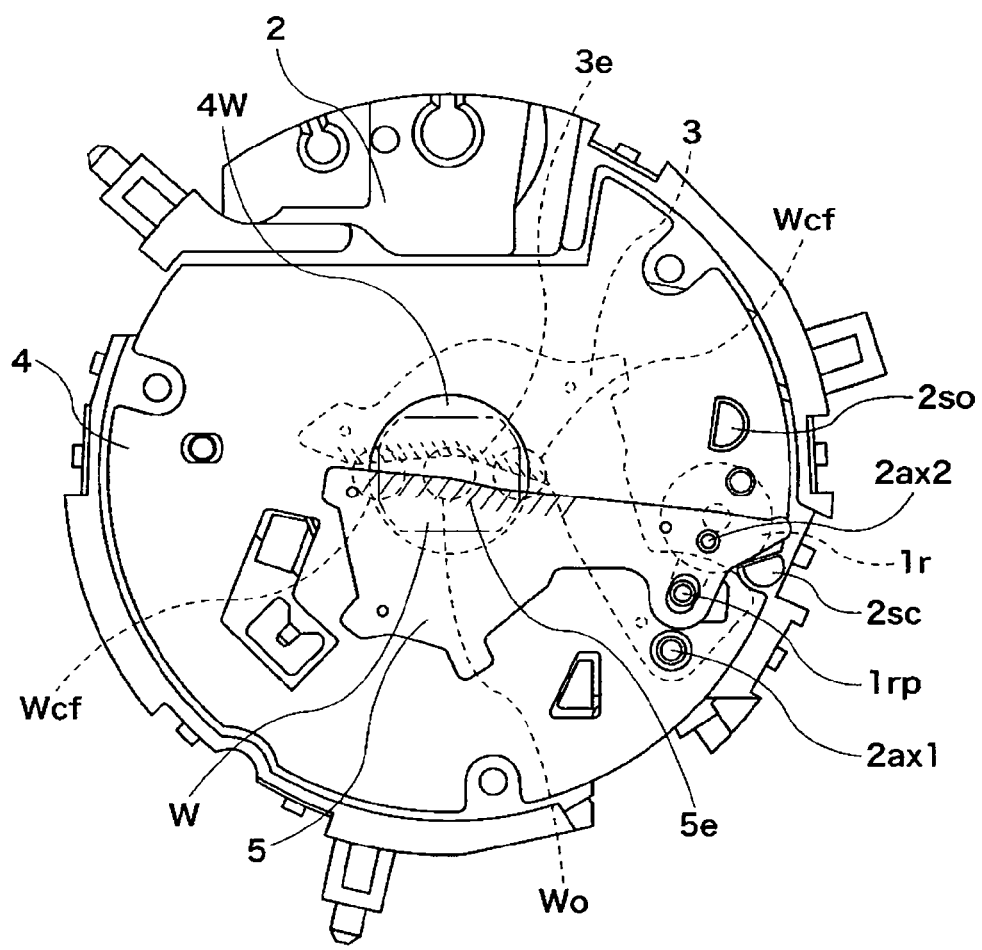
FIG. 9 is a front view showing a condition just before the shutter unit finishes closing.

FIG. 7 is a view showing the closing travel operation of the shutter blades in the shutter unit 106 of this embodiment, and FIG. 8 is a graph showing exposures in quadrants of the aperture W in the shutter unit 106 of this embodiment. FIG. 9 is a front view showing a condition just before the upper shutter blade 3 and the lower shutter blade 5 finish closing the aperture W, and FIG. 10 is a front view showing a condition in which the upper shutter blade 3 and the lower shutter blade 5 have finished closing the aperture W.

As shown in FIG. 4 through FIG. 7, the upper shutter blade 3 and the lower shutter blade 5 are pivotally supported by the blade-supporting-shaft 2*ax*1 and 2*ax*2, respectively, so that the blades travel in the direction along the short side Wb of the aperture W while keeping a condition in which edges 3*e* and 5*e* are almost parallel to the long side Wa of the aperture W.

As shown in FIG. 4, under the standby condition for waiting to shoot, the rotor 1*r* of the electromagnetic actuator 1 receives magnetic energizing force to rotate to an open side under an un-energized condition, and the upper shutter blade 3 and the lower shutter blade 5 are standing by at positions distant from the aperture W.

Since these standby positions are distant from the aperture W in the direction along the short side Wb (the direction perpendicular to the long side Wa) of the aperture W, the distance from the aperture W becomes larger than that in a case where standby positions are distant from the aperture W in the direction along the long side W. In other words, since the standby positions are distant from the aperture W in the direction perpendicular to the long side Wa of the aperture W, approach distances to positions where the shutter blades 3 and 5 start closing the aperture W from the standby positions become larger than that in a case where standby positions are distant from the aperture W in the direction along the long side Wa.

In the above-mentioned standby condition, when an electric current is applied to the electromagnetic actuator 1 so as to rotate in a clockwise direction in FIG. 4 etc., the upper shutter blade 3 and the lower shutter blade 5 travel in directions shown by an arrow Ar1 and an arrow Ar2 (opposite to each other) in FIG. 4, respectively, and gradually close the aperture W.

In this case, the upper shutter blade 3 and the lower shutter blade 5 start to travel from the standby positions that are distant from the aperture W in the direction along the short side Wb of the aperture W. This means that a time interval to a timing to start closing the aperture W from a timing to start traveling, i.e., an approach time can become longer than that in a case where the shutter blades start traveling from standby positions that are distant from the aperture W in the direction along the long side Wa due to a length relation of the above-mentioned approach distances.

Therefore, when the upper shutter blade 3 and the lower shutter blade 5 start closing the aperture W (see FIG. 5), the upper shutter blade 3 and the lower shutter blade 5 are accelerated rather than the case where the shutter blades stand by at the positions distant from the aperture W in the direction along the long side Wa of the aperture W.

Therefore, a time interval to a timing to finish closing the aperture W from a timing to start closing the aperture W is shortened, that is, a speed of the shutter blades during the closing travel operation becomes faster, as compared with the case where the shutter blades stand by at the positions distant from the aperture W in the direction along the long side Wa of the aperture W.

In this embodiment, as shown in FIG. 6, shapes of the upper shutter blade 3 and the lower shutter blade 5 are designed so that edge portions 3*o* and 5*o* that cover a center area Wo of the aperture W start shading the aperture W before edge portions 3*c* and 5*c* that cover four corner areas Wcn of the aperture W start shading the aperture W.

As shown in FIG. 9, when closing the aperture W, an aperture shape formed between the edge 3*e* of the upper shutter blade 3 and the edge 5*e* of the lower shutter blade 5 becomes rectangle that is longer in the direction of the long side Wa of the aperture W, and the center area Wo and the corner areas Wcn are shaded almost simultaneously.

Figure 14:
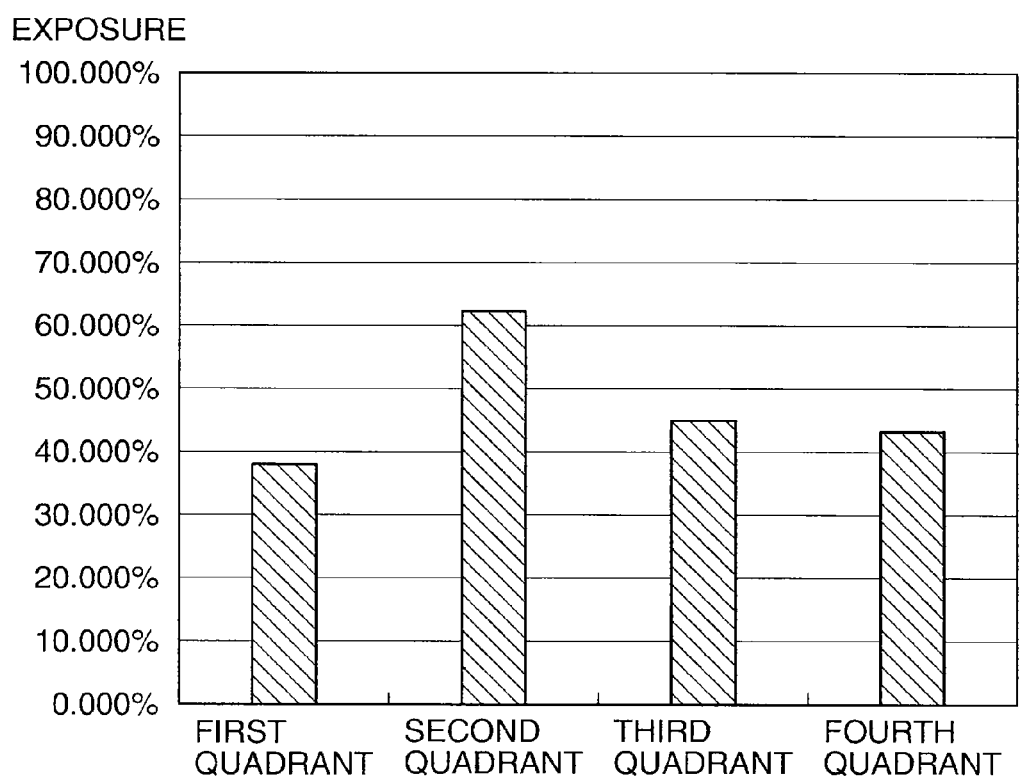
FIG. 14 is a graph showing exposures in quadrants of the aperture in the conventional shutter unit shown in FIG. 13.

The rectangular aperture W is equally divided into four, and a first quadrant A, a second quadrant B, a third quadrant C, and a fourth quadrant D are set up. The shutter blades 3 and 5 of the embodiment are possible to gradually shade the first quadrant A, the second quadrant B, the third quadrant C, and the fourth quadrant D of the aperture W while keeping the edges 3e and 5e being almost parallel to the long side Wa of the aperture and while keeping a good balance in the direction of the short side Wb of the aperture W. Accordingly, as shown in FIG. 8, a difference among the exposures of the first quadrant A, the second quadrant B, the third quadrant C, and the fourth quadrant D of the aperture W becomes less than the prior art shown in FIG. 14. This facilitates a shading correction process to correct shading due to the shutter unit 106 as describe in detail later. Since the upper shutter blade 3 and the lower shutter blade 5 travel in the direction along the short side Wb, the time interval to a timing to finish closing the aperture W from a timing to start closing the aperture W is shortened, which decreases the difference among the exposures.

It should be noted that contrivances about the positions of the pivot axes and the blade shapes of the upper shutter blade 3 and the lower shutter blade 5 achieve the operations in which the shutter blades 3 and 5 gradually shade the first quadrant A, the second quadrant B, the third quadrant C, and the fourth quadrant D of the aperture W while keeping the edges 3e and 5e being almost parallel to the long side Wa of the aperture and while keeping a good balance in the direction of the short side Wb of the aperture W. That is, in this embodiment, the shapes of the upper shutter blade 3 and the lower shutter blade 5 are devised so that the edge 3e of the upper shutter blade 3 and the edge 5e of the lower shutter blade 5 are parallel to the long side Wa of the aperture W as much as possible.

The mounting positions of the blade-supporting-shafts 2ax1 and 2ax2 for the upper shutter blade 3 and the lower shutter blade 5 are specified so that the edge 3e of the upper shutter blade 3 and the edge 5e of the lower shutter blade 5 travel in the opposite directions that are perpendicular to the long side Wa of the aperture W.

According to such a configuration, since the first quadrant A, the second quadrant B, the third quadrant C, and the fourth quadrant D of the aperture W are gradually shaded while keeping the edges 3e and 5e being almost parallel to the long side Wa of the aperture W and while keeping a good balance in the direction of the short side Wb of the aperture W, the difference among exposures in the direction of the long side Wa in the picked up image becomes small, and the difference among exposures in the direction of the short side Wb becomes symmetrical. As mentioned below, the shading due to the operation of the shutter unit 106 can be corrected by an easy process.

Next, the shading correction process to correct the shading that is generated in connection with the closing travel operation of the shutter unit 106 will be described with reference to FIG. 11A, FIG. 11B, FIG. 12A, and FIG. 12B. Hereafter, a line of pixels in the long side direction on the picked up image is called a horizontal line, and a line of pixels in the short side direction is called a vertical line.

Figure 11A:
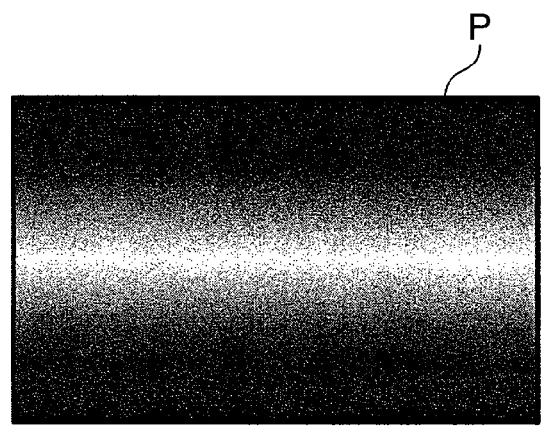
FIG. 11A is a view showing a two-dimensional distribution of the exposure when the shutter unit shown in FIG. 1 operates.
Figure 11B:
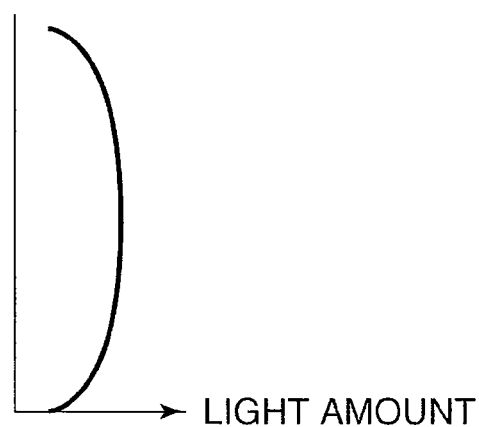
FIG. 11B is a graph showing the distribution of the exposure shown in FIG. 11A in a direction of a short side of the image pick-up area.

As mentioned above, when the aperture W is gradually shaded while keeping the edges 3e and 5e being almost parallel to the long side Wa of the aperture W and while keeping a good balance in the direction of the short side Wb of the aperture W, the shading due to the operation of the shutter unit 106 presents a distribution in which a light amount gradually increases from the uppermost and lowermost horizontal lines toward the center horizontal line as shown in FIG. 11A. In this case, the light amount variation of pixels arranged on a certain vertical line presents a simple approximately ellipse-like variation as shown in FIG. 11B. Moreover, the simple approximately ellipse-like light amount variation like FIG. 11B becomes almost the same in all the vertical lines.

Therefore, the shading due to the shutter unit 106 can be corrected by an easy process for controlling a gain electrically. That is, as shown in FIG. 12B, when increasing the gain in the upper and lower vertical positions with a little light amount and decreasing the gain in the center vertical positions with much light amount, the shading due to the shutter unit 106 can be easily corrected.

Figure 12A:
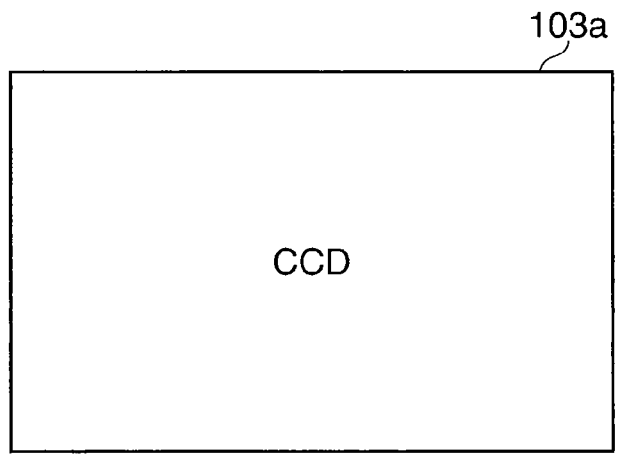
FIG. 12A is a plan view showing a shape of an image pick-up device.
Figure 12B:
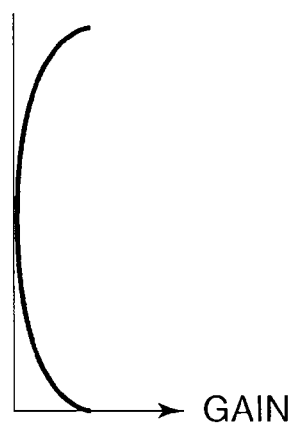
FIG. 12B is a graph showing a distribution of a gain of an amplifying circuit for correcting the distribution of the exposure shown in FIG. 11B.
Figure 13:
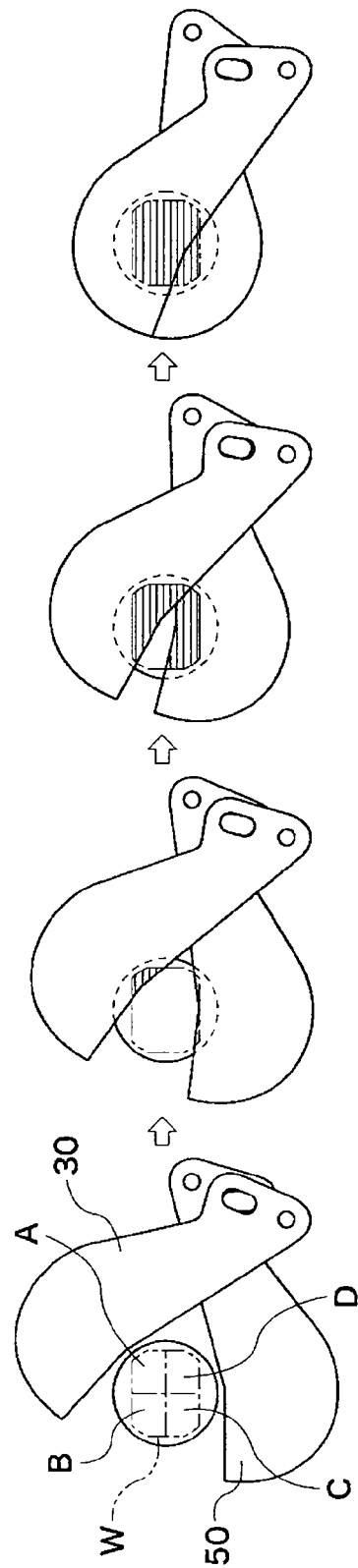
FIG. 13 is a view showing travel operations of shutter blades in a conventional shutter unit.

It is enough to store data of pixels on only one vertical line of the CCD 103a shown in FIG. 12A as the image pick-up device as correction data to control the electric gain. Therefore, the shading can be corrected easily and cheaply. It is because there is little light amount variation in the horizontal as shown in FIG. 11A, and the simple light amount variation of the approximately ellipse like FIG. 11B becomes almost the same as mentioned above in all the vertical lines, and therefore, the above-mentioned stored data is applicable to each vertical line.

As mentioned above, this embodiment corrects the shading in the picked-up image that occurs in connection with the closing travel operation by the shutter unit 106 by the easy correction process using a little correction data. Since the light falloff at edges, which becomes remarkable when the diaphragm unit and the shutter unit are arranged with a space therebetween, shows a concentric light amount around the center of the aperture W, it can be corrected using correction data corresponding to the distance from the center of the aperture.

It should be noted that this embodiment assumes that the shading due to the shutter unit 106 is corrected by controlling the electric gain by the A/D conversion unit 107. In this case, the A/D conversion unit 107 can control the gain of the image signal acquired from the pixels of the CCD 103a using the same correction data to all the vertical lines of the CCD 103a.

However, the shading due to the shutter unit 106 can be corrected by the image process in the image processing unit 108. Also in this case, since it is enough to store the data on one vertical line of the CCD 103a as the correction data, the shading can be corrected easily and cheaply.

It should be noted that the present invention is not limited by the above-mentioned embodiment, but the technical idea of the above-mentioned embodiment can be applied to a shutter unit that has three or more shutter blades, or an image pick-up apparatus that is equipped with the shutter unit.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-188429, filed on Aug. 17, 2009, which is hereby incorporated by reference herein in its entirety.

What is claimed is:
1. An image pick-up apparatus comprising:
a lens adapted to form an image of a subject;
an image pick-up device adapted to pick up the image formed;
a shutter unit adapted to open and close an aperture corresponding to an image pick-up area of said image pick-up device by means of a plurality of shutter blades;

wherein edges of the shutter blades facing the aperture pivot in mutually opposite directions when the shutter blades initially shade said aperture, wherein the edges of the shutter blades facing the aperture are non-linear, wherein the edges of the shutter blades facing the aperture pivot in mutually opposite directions non-perpendicular to a long side of the aperture before the edges of the shutter blades facing the aperture cover the aperture, wherein the edges of the shutter blades facing the aperture that cover a center area of the aperture start shading the aperture before the edges of the shutter blades facing the aperture that cover four corner areas of the aperture start shading the aperture;

a correction unit that corrects a shading that occurs in connection with a closing travel operation by the shutter blades by controlling an electric gain, wherein said correction unit controls the electric gain of an image signal acquired from said image pick-up device using the same correction data to all pixel lines in a short side direction of said image pick-up device.

2. The image pick-up apparatus according to claim 1, wherein the acquired image signal is an analog image signal, and said correction unit corrects shading in a picked up image that occurs in connection with the closing travel operation of the shutter blades by controlling the electric gain at a time when converting the analog image signal into a digital image signal.

3. The image pick-up apparatus according to claim 1, wherein the shutter blades are arranged on both sides of a separation plate, and have projections that contact the separation plate concerned.

4. The image pick-up apparatus according to claim 3, wherein the shutter blades are arranged on both sides of a separation plate, and have projections that contact the separation plate concerned.

5. An image pick-up apparatus comprising:

a lens adapted to form an image of a subject;

an image pick-up device adapted to pick up the image formed;

a shutter unit adapted to open and close an aperture corresponding to an image pick-up area of said image pick-up device by means of a plurality of shutter blades;

wherein edges of the shutter blades facing the aperture pivot in mutually opposite directions when the shutter blades initially shade said aperture, wherein the edges of the shutter blades facing the aperture are non-linear, wherein the edges of the shutter blades facing the aperture pivot in mutually opposite directions non-perpendicular to a long side of the aperture before the edges of the shutter blades facing the aperture cover the aperture, wherein the edges of the shutter blades facing the aperture that cover a center area of the aperture start shading the aperture before the edges of the shutter blades facing the aperture that cover four corner areas of the aperture start shading the aperture;

a correction unit that corrects a shading that occurs in connection with a closing travel operation by the shutter blades by controlling an electric gain, wherein said correction unit corrects shading in a picked up image that occurs in connection with the closing travel operation of the shutter blades by controlling the electric gain at a time when converting an analog image signal acquired from said image pick-up device into a digital image signal, and wherein said correction unit controls the electric gain of the image signal acquired from said image pick-up device using the same correction data to all pixel lines in the short side direction of said image pick-up device.

* * * * *